(12) United States Patent
Reynolds et al.

(10) Patent No.: US 11,052,723 B2
(45) Date of Patent: Jul. 6, 2021

(54) AIR CONDITIONING SYSTEM FOR USE WITH UNENCLOSED MOWERS

(71) Applicant: B & D Technologies, LLC, Accomac, VA (US)

(72) Inventors: Orvell B. Reynolds, Ridgeland, MS (US); Devon Fairhurst, Onancock, VA (US)

( * ) Notice: Subject to any disclaimer, the term of this patent is extended or adjusted under 35 U.S.C. 154(b) by 0 days.

(21) Appl. No.: 16/163,426

(22) Filed: Oct. 17, 2018

(65) Prior Publication Data

US 2019/0118611 A1 Apr. 25, 2019

Related U.S. Application Data

(63) Continuation-in-part of application No. PCT/US2017/061438, filed on Nov. 14, 2017, which
(Continued)

(51) Int. Cl.
*B60H 1/00* (2006.01)
*A01D 67/02* (2006.01)
(Continued)

(52) U.S. Cl.
CPC ......... *B60H 1/00407* (2013.01); *A01D 67/02* (2013.01); *B60H 1/00421* (2013.01);
(Continued)

(58) Field of Classification Search
CPC . F02B 67/06; B60H 1/00407; B60H 1/00421; B60H 1/0045; B60H 1/3222
See application file for complete search history.

(56) References Cited

U.S. PATENT DOCUMENTS 3,306,067 A 2/1967 Anglin
3,415,072 A * 12/1968 White .................. B60H 1/3222
62/239
(Continued)

FOREIGN PATENT DOCUMENTS

KR 20070025932 A 3/2007
WO 2010079301 A1 7/2010

OTHER PUBLICATIONS

PCT, "International Search Report," issued in connection with PCT Application No. PCT/US2017/061438, dated Jan. 8, 2018.
(Continued)

*Primary Examiner* — Christopher R Zerphey
(74) *Attorney, Agent, or Firm* — AdamsIP, LLC; Edward Garner; James Adams

(57) ABSTRACT

An air conditioning system for use with unenclosed mowers is provided. The system is designed for installation on unenclosed mowers to provide conditioned air to operators of such mowers. The system comprises an air conditioning unit and a compressor drive assembly. The air conditioning unit is configured to generate and emit conditioned air and comprises a compressor, condenser, and evaporator unit. The compressor drive assembly may interconnect the mower's engine to the air conditioning unit such that rotational motion generated by the engine is transmitted to the air conditioning unit. To this end, the compressor drive assembly may include a crankshaft pulley assembly, a gearbox having two pulleys, and a plurality of pulley belts. The system may also include an alternator.

18 Claims, 9 Drawing Sheets

Related U.S. Application Data is a continuation-in-part of application No. PCT/US2017/057436, filed on Oct. 19, 2017.

(51) Int. Cl.
    *B60H 1/32* (2006.01)
    *A01D 101/00* (2006.01)

(52) U.S. Cl.
    CPC ....... B60H 1/3222 (2013.01); *A01D 2101/00* (2013.01); *B60H 1/3229* (2013.01); *B60H 2001/00242* (2013.01)

(56) References Cited

U.S. PATENT DOCUMENTS

| | | | |
|---|---|---|---|
| 3,720,048 A | 3/1973 | Grubb et al. | |
| 3,841,108 A * | 10/1974 | Pierrat | B60H 1/3222 |
| | | | 62/236 |
| 3,948,312 A | 4/1976 | Nisbet | |
| 4,299,078 A | 11/1981 | Werner et al. | |
| 4,452,193 A * | 6/1984 | Morris | F02B 67/06 |
| | | | 123/195 A |
| 4,607,714 A * | 8/1986 | Uttenthaler | B60K 11/02 |
| | | | 180/68.1 |
| 4,828,017 A | 5/1989 | Watanabe | |
| 5,112,535 A | 5/1992 | Robertson | |
| D404,402 S | 1/1999 | Wolf | |
| 5,911,624 A | 6/1999 | Stauffer | |
| 6,044,632 A | 4/2000 | Schmalz et al. | |
| 6,112,538 A | 9/2000 | Strussion | |
| 6,189,304 B1 | 2/2001 | Velke et al. | |
| 6,261,173 B1 | 7/2001 | Odebrecht | |
| 6,435,293 B1 | 8/2002 | Williams | |
| 7,184,074 B1 | 2/2007 | Jansen | |
| 7,743,590 B1 * | 6/2010 | Gidden | A01D 34/82 |
| | | | 56/13.7 |
| 8,033,899 B2 | 10/2011 | Ichikawa | |
| 8,230,761 B2 * | 7/2012 | Takashina | F02B 67/06 |
| | | | 180/364 |
| 8,376,817 B2 | 2/2013 | Ichikawa | |
| 8,732,947 B2 * | 5/2014 | Swanson | F16D 27/112 |
| | | | 29/889.1 |
| 10,259,287 B2 | 4/2019 | Reynolds | |
| 10,589,619 B2 * | 3/2020 | Stahl | B60K 25/02 |
| 10,632,815 B2 | 4/2020 | Reynolds | |
| 2002/0081917 A1 * | 6/2002 | Roycroft | B60K 17/28 |
| | | | 440/38 |
| 2002/0096133 A1 * | 7/2002 | McGovern | F01P 5/12 |
| | | | 123/41.48 |
| 2006/0102415 A1 | 5/2006 | Menebroker | |
| 2007/0028634 A1 | 2/2007 | Twaddle | |
| 2007/0151220 A1 | 7/2007 | Bergsten | |
| 2009/0038186 A1 | 2/2009 | Osswald | |
| 2009/0266097 A1 * | 10/2009 | Hamilton | B60H 1/3222 |
| | | | 62/236 |
| 2010/0132391 A1 | 6/2010 | Barot | |
| 2010/0326755 A1 | 12/2010 | Husson et al. | |
| 2011/0292211 A1 | 12/2011 | Abraham | |
| 2012/0028682 A1 | 2/2012 | Danne | |
| 2012/0205946 A1 | 8/2012 | Taylor | |
| 2012/0247846 A1 | 10/2012 | Ichikawa | |
| 2013/0118708 A1 | 5/2013 | Ichikawa | |
| 2014/0060219 A1 * | 3/2014 | Marotte | B60K 25/06 |
| | | | 74/15.86 |
| 2014/0065936 A1 * | 3/2014 | Smith | B60K 26/02 |
| | | | 454/69 |
| 2014/0309882 A1 | 10/2014 | Antchak et al. | |
| 2015/0114020 A1 * | 4/2015 | Bergman | B60H 1/00378 |
| | | | 62/244 |
| 2015/0272005 A1 | 10/2015 | Fletcher | |
| 2016/0107500 A1 | 4/2016 | Ichikawa | |

OTHER PUBLICATIONS

PCT, "Written Opinion," issued in connection with PCT Application No. PCT/US2017/061438, dated Jan. 8, 2018.

PCT Application No. PCT/US2017/061438, Response to the International Search Report and the Written Opinion of the International Searching Authority, filed Nov. 14, 2017.

PCT, "International Preliminary Report on Patentability," issued in connection with PCT Application No. PCT/US2017/061438, dated Nov. 18, 2019.

PCT, "International Search Report," issued in connection with PCT Application No. PCT/US2017/057436, dated Jul. 17, 2018.

PCT, "Written Opinion," issued in connection with PCT Application No. PCT/US2017/057436, dated Jul. 17, 2018.

\* cited by examiner

AIR CONDITIONING SYSTEM FOR USE WITH UNENCLOSED MOWERS

CROSS-REFERENCE TO RELATED APPLICATIONS

This application is a continuation-in-part application of co-pending International Patent Application No. PCT/US17/61438, filed Nov. 14, 2017, which claims priority to International Application No. PCT/US17/57436, filed Oct. 19, 2017, each of which are incorporated by reference herein in their entirety.

FIELD OF THE DISCLOSURE

The subject matter of the present disclosure refers generally to an air conditioning system for use with unenclosed mowers.

BACKGROUND

Individuals and business entities alike spend countless hours maintaining and beautifying the lawns and general landscape of their property. Whether as a matter of personal pride and expression or as a means of enticing clientele, landowners often manicure the grass, plant and maintain flowers, shrubs, bushes, and trees, and clear fallen debris from the ground in order to enhance the aesthetic qualities of their property. On properties with large areas of grass, lawnmowers that enable users to sit while mowing are commonly utilized to reduce both the physical energy and duration of time spent cutting grass. For increased mowing speed and precision, zero-turn mowers are frequently used for commercial and non-commercial mowing applications alike because of the reduced turning radius offered by such mowers.

However, the duration of time in which users can operate mowers in an outside environment is often limited by the weather due to the generally unenclosed design of such mowers. Generally, while operating a mower, the user is completely exposed and subject to the environmental and weather conditions present in the area being mowed. In turn, during summer months, when grass growth and lawn maintenance are generally at their highest, operators of these mowers are often exposed to extreme heat and potentially harmful ultraviolet radiation for extended periods of time. The operator is also completely subjected to any dust, dirt, or allergens that may be kicked up by the mower or otherwise present within the mowing area. As a result, operators of mowers are often forced to retreat to an indoor area to escape the environmental and weather conditions present within the area being mowed, thereby prolonging both the time and effort spent mowing.

Accordingly, there is a need in the art for an air conditioning system for unenclosed mowers that enables users to operate mowers during periods of extreme heat.

SUMMARY

In accordance with the present disclosure, an air conditioning system for use with unenclosed mowers is provided. The system of the present disclosure is designed for installation on an unenclosed mower to generate and provide cool, conditioned air to an operator of the mower. The system generally comprises an air conditioning unit and a compressor drive assembly. The air conditioning unit is configured to generate and emit conditioned air and may comprise a condenser, an evaporator unit, and a compressor fluidly interconnected such that coolant circulates through each respective component of the air conditioning unit during operation of the system. In some instances, components of the air conditioning unit may be fluidly interconnected such that coolant exiting the condenser is directed towards the evaporator unit, coolant exiting the evaporator unit is directed toward the compressor, and coolant exiting the compressor is directed toward the condenser.

The compressor drive assembly is configured to power the compressor by transmitting the rotational motion generated by the engine of the mower to which the system is installed to the compressor. As such, the compressor drive assembly may be adapted to be mechanically interconnected between the crankshaft of a mower's engine and a pulley associated with the compressor such that rotation of the crankshaft causes the compressor's pulley to rotate, thereby mechanically powering the compressor. When powered, the compressor may pressurize coolant received from the evaporator unit and direct the same to the condenser where it is cooled and subsequently directed to the evaporator unit, which evaporates the coolant to emit conditioned air. In some instances, the compressor may have an electromagnetic clutch that must be mated with the compressor's pulley before the compressor pressurizes and directs coolant to the condenser. Coolant exiting the evaporator unit is directed back to the compressor for recirculation.

The compressor drive assembly may comprise a crankshaft pulley assembly and a gearbox having a first pulley mechanically connected to the crankshaft pulley assembly and a second pulley mechanically connected to the compressor's pulley. The gearbox's first and second pulleys are in mechanical communication such that rotation of the gearbox's first pulley causes the gearbox's second pulley to rotate. In an embodiment, the crankshaft pulley assembly may comprise a first pulley configured to be mechanically connected to the mower's crankshaft and a second pulley mechanically connected to the gearbox's first pulley. Where the crankshaft pulley assembly includes a first and second pulley, the first and second pulley of the crankshaft pulley assembly are in mechanical communication such that rotation of the crankshaft assembly's first pulley causes the crankshaft assembly's second pulley to rotate. In another embodiment, the crankshaft pulley assembly may be defined by a single pulley operably connected to the mower's crankshaft.

The system may further comprise an alternator, which may be used to provide electrical power to certain components within the system and/or the mower to which the system is installed. The alternator includes a pulley and is configured to convert the mechanical energy applied to its pulley to electrical energy. In an embodiment, the compressor's pulley may be mechanically connected to the alternator's pulley such that rotation of the compressor's pulley causes the alternator's pulley to rotate. In such embodiments, a first belt may mechanically connect the compressor's pulley to the gearbox's second pulley while a second belt mechanically connects the compressor's pulley to the alternator's pulley. In other embodiments, the gearbox's second pulley may be mechanically connected to the alternator's pulley such that rotation of the gearbox's second pulley causes the alternator's pulley to rotate. Where the alternator's pulley is directly connected to the gearbox's second pulley, a single belt may mechanically interconnect the gearbox's second pulley, the alternator's pulley, and the compressor's pulley together. In some instances, the evaporator unit may be electrically connected to a power supply and the alternator may be electrically connected to the power supply and/or an ignition switch of the mower.

The system may be installed on an unenclosed mower by securing the system's respective elements directly or indirectly to the mower's frame. When the system is installed, the evaporator unit is positioned such that conditioned air generated by the evaporator unit is directed towards an operator during operation of the mower. To facilitate passage of ambient air through the condenser and to direct coolant exiting the condenser to the evaporator unit, the condenser may also be secured above the evaporator unit. The system may further comprise an air conditioning frame configured to secure to the frame of a mower and to which the condenser and evaporator unit may be secured. In some instances, the system may further comprise a housing secured to the air conditioning frame that at least partially houses the condenser and evaporator unit from adverse environmental conditions. Depending on the design and orientation of the mower's engine, the compressor, compressor drive assembly, and alternator may be secured to the undercarriage of the mower.

The foregoing summary has outlined some features of the system of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the system disclosed herein. Those skilled in the pertinent art should also realize that such equivalent designs or modifications do not depart from the scope of the device and methods of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
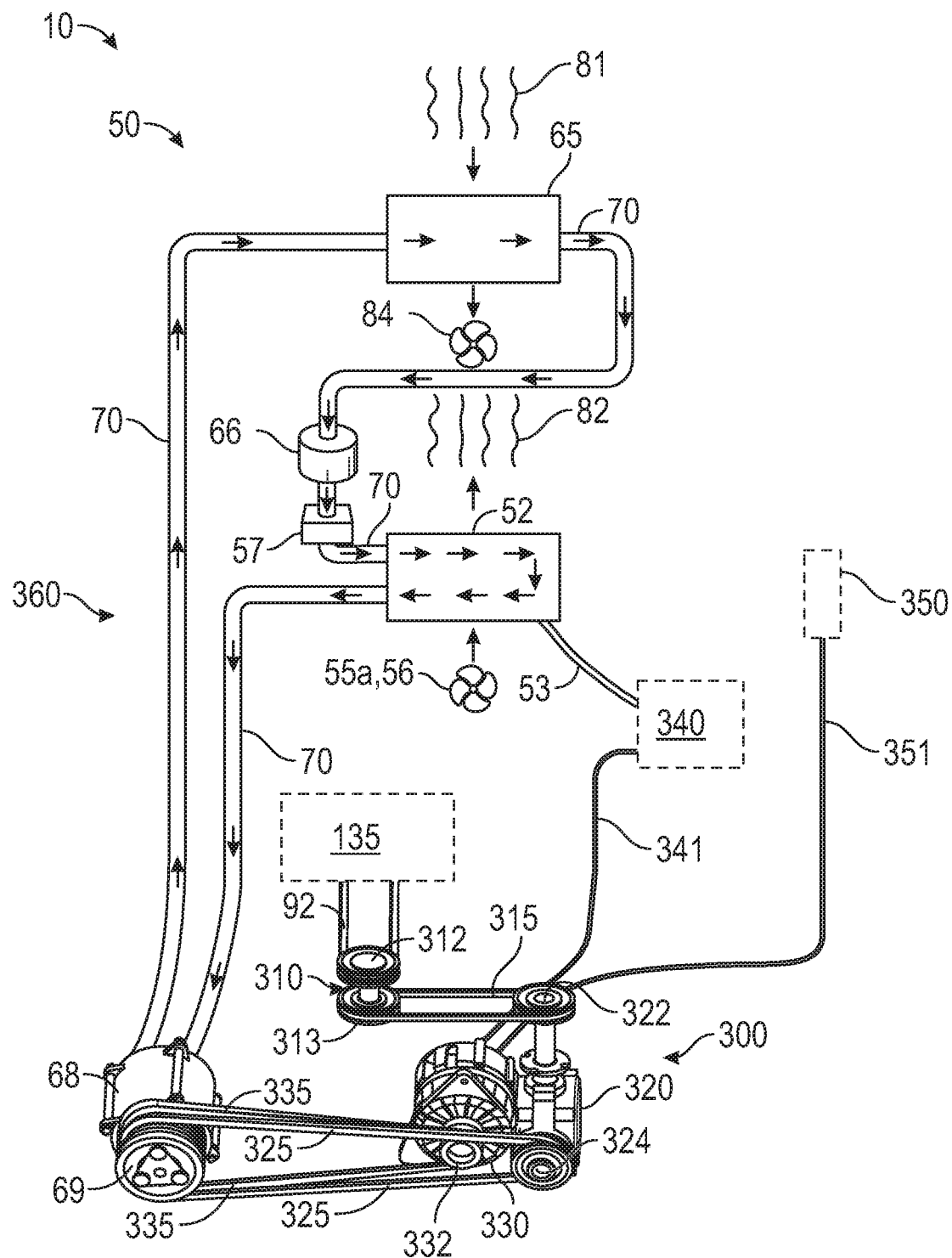
FIG. 1 is a process flow diagram of a system embodying features consistent with the principles of the present disclosure.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As used herein the term "coolant" and grammatical equivalents thereof are used herein to mean any cooling agent designed to transition from a low-pressure gas to a high-pressure liquid within the air conditioning unit disclosed herein. Such coolants may include, but are not limited to, R-22 refrigerant, R-410A refrigerant, R-407C refrigerant, and R-134a refrigerant. The term "fastener" and grammatical equivalents thereof are used herein to mean a device or instrument configured to secure or connect one object to another. Examples of a fastener include, but are not limited to, screws, nuts and bolts, nails, rivets, or any other suitable device or instrument which may be used to secure the components of the system of the present disclosure in the manner described herein.

It can be appreciated that terms such as first, second, etc. may be used herein to identify or describe various elements, and that the elements identified or described by such terms should should not be limited by the same. These terms are only used to distinguish one element from another element. Thus, a first element discussed below could be termed a second element without departing from the scope of the present invention. Additionally, it should be understood that when an element is referred to as being "secured" to another element, it can be directly secured to the other element or intervening elements may be present. In contrast, when an element is referred to as being "directly secured" or "secured directly" to another element, there are no intervening elements present. It should also be understood that the sizes and relative orientations of the illustrated elements are not shown to scale and, in some instances, may be exaggerated for purposes of explanation.

Turning now to the drawings, FIGS. 1-9 illustrate embodiments of an air conditioning system for use with unenclosed mowers (the "system") 10. As shown within the drawings, the system 10 of the present disclosure may be designed for installation on zero-turn mowers. However, one of skill in the art will appreciate that various components of the system 10, as described herein, may be designed and adapted such that the system may be installed on other types of unenclosed mowers including, but not limited to, lawn tractors.

The system 10 generally comprises a compressor drive assembly 300 and an air conditioning unit 50 having an evaporator unit 52, a condenser 65, and a compressor 68 fluidly interconnected. The compressor drive assembly 300 and air conditioning unit 50 are each designed for installation on an unenclosed mower 100. When the system 10 is installed, the compressor drive assembly 300 is mechanically interconnected between the engine 135 of a mower 100 and the air conditioning unit 50 such that rotational motion generated by the mower's engine 135 is transmitted to the air conditioning unit's 50 compressor 68 to mechanically power the same. When powered, the compressor 68 pressurizes and directs coolant to the condenser 65 where it is cooled and subsequently directed to the evaporator unit 52 which evaporates the coolant and emits conditioned air 82 to an operator of the mower 100.

As shown in FIG. 1, the air conditioning unit 50 generally comprises a compressor 68, a condenser 65, and an evaporator unit 52. The compressor 68, condenser 65, and evaporator unit 52 are fluidly interconnected to form a circuit 360 through which coolant may circulate during operation of the system 10. Preferably, the compressor 68, condenser 65, and evaporator unit 52 are fluidly connected such that coolant exiting the compressor 68 is directed to the condenser 65, coolant exiting the condenser 65 is directed to the evaporator unit 52, and coolant exiting the evaporator unit is directed to the compressor 68. The compressor 68 may be fluidly connected to the condenser 65 by connecting a first end of a refrigeration hose 70 to an outlet of the compressor 68 and a second end of the refrigeration hose 70 to an inlet of the condenser 65. The condenser 65 may be fluidly connected to the evaporator unit 52 by connecting the first end of a refrigeration hose 70 to an outlet of the condenser 65 and a second end of the refrigeration hose 70 to an inlet of the evaporator unit 52. The evaporator unit 52 may be fluidly connected to the compressor 68 by connecting a first end of a refrigeration hose 70 to an outlet of the evaporator unit 52 and a second end of the refrigeration hose 70 to an inlet of the compressor 68. Accordingly, the system 10 of the present disclosure may use a plurality of refrigeration hoses 70 to interconnect various components of the air conditioning unit 52. The refrigeration hoses 70 within the system 10 may comprise any piping, tubing, or hosing that provides a conduit suitable for coolant to pass through and that is adapted to interconnect one air conditioning unit 50 component to another. For instance, the refrigeration hoses 70 may comprise a rubber tubing, copper or other metal piping, or combinations thereof.

Figure 4:
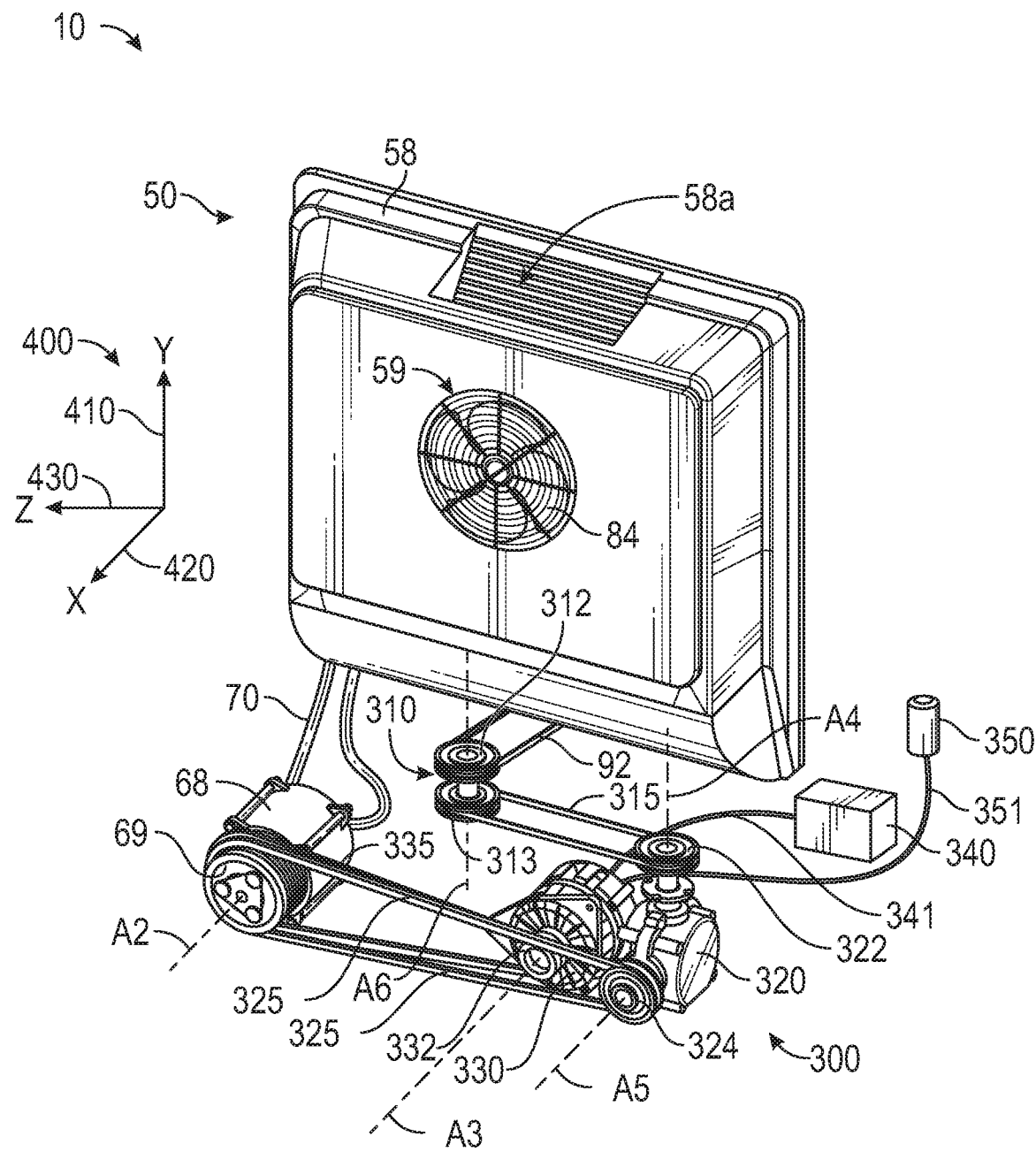
FIG. 4 is a rear perspective view of a system embodying features consistent with the principles of the present disclosure.

The compressor 68 is configured to pressurize coolant received from the evaporator unit 52 and to direct such coolant to the condenser 65. To this end, the compressor may convert low-pressure coolant vapor received from the evaporator unit 52 into high-pressure coolant vapor. As shown in FIGS. 1 and 4, the compressor 68 has a pulley 69 associated therewith configured to rotate in response to rotational motion generated by the engine 135 and subsequently transmitted by the compressor drive assembly 300 to the compressor 68. To receive coolant from the evaporator unit 52 and to direct coolant to the condenser 65, the compressor has an inlet and outlet, respectively (not shown). The compressor 68 may be configured such that any time rotational motion is applied to the compressor's pulley 69, the compressor 68 is engaged. When engaged, the compressor 68 suctions low-pressure coolant from the evaporator unit 52 through its inlet, compresses such coolant into high-pressure coolant, and subsequently pumps the high-pressure coolant to the condenser 65. In some instances, engagement of the compressor 68 may be regulated by an electromagnetic clutch. In such embodiments, the compressor 68 is engaged only when the clutch is mated with the compressor's 68 pulley 69 and the pulley 69 is rotating. Accordingly, when the clutch is unmated with the compressor's pulley 69 the compressor pulley 69 may rotate freely without engaging the compressor 68. Transition of the clutch from a mated configuration to a non-mated configuration may be governed by application of electrical current to a coil disposed in proximity to the compressor's pulley 69 such that the clutch is mated with the compressor's pulley 69 when electrical current is applied to the coil and unmated with the compressor's pulley 69 in the absence of such electrical current. In some instances, one or more components of the compressor 68 may be electrically connected to the evaporator unit 52 such that when the air conditioning unit is powered on via user interaction with the evaporator unit 52, as describe herein, electrical current is directed to the coil. The compressor 68 may comprise a piston-type compressor, though other pulley-driven compressors, such as hydraulic compressors, may be used and still fall within the scope of the subject matter disclosed herein.

Figure 2:
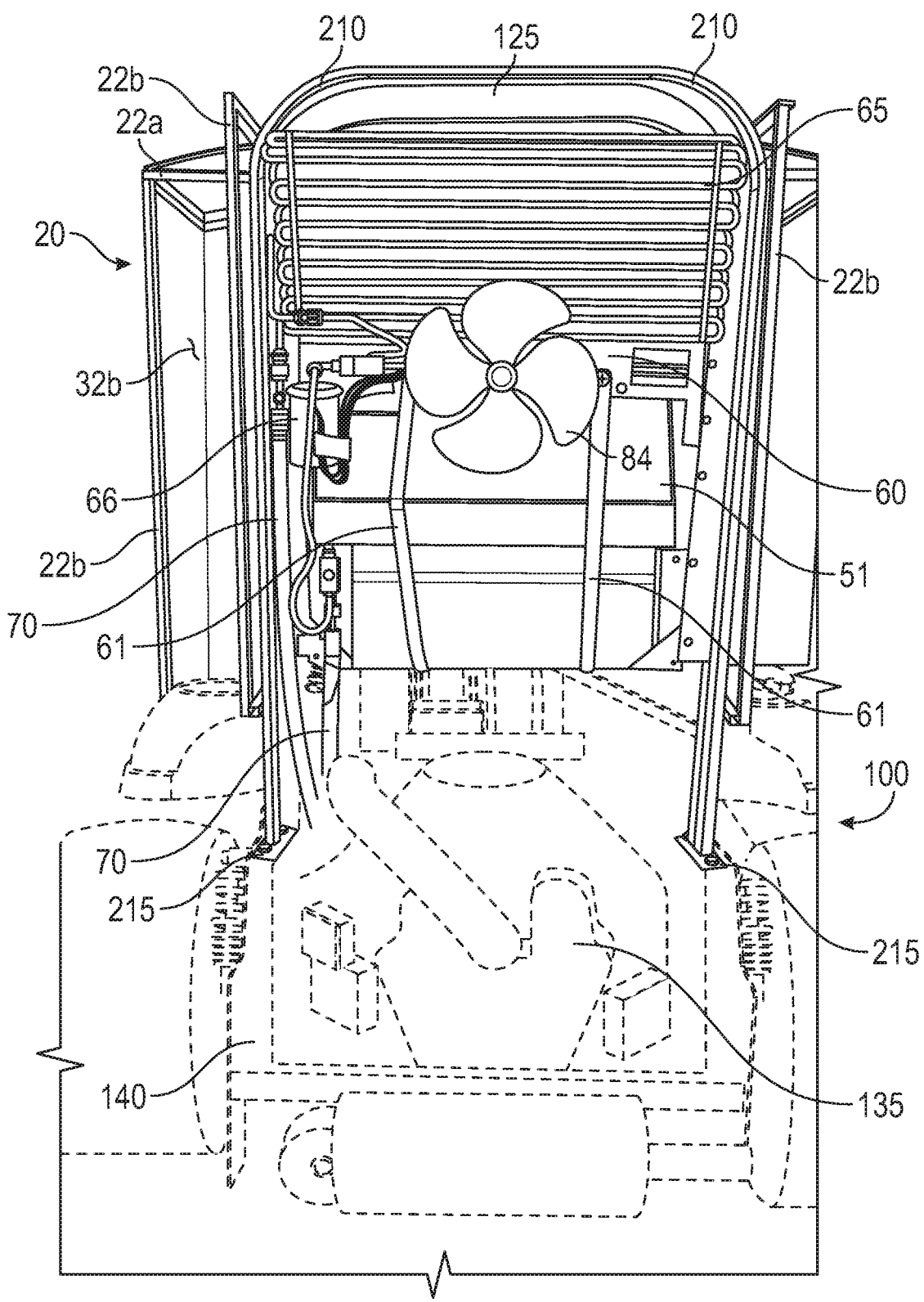
FIG. 2 shows a front view of certain components of an air conditioning unit embodying features consistent with the principles of the present disclosure secured to the frame of a mower via an air conditioning frame embodying features consistent with the principles of the present disclosure.

The condenser 65 comprises one or more tubes through which coolant received from the compressor 68 may flow through and a plurality of condenser fins through which air directed toward the condenser 65 may pass through. To allow for flushing of the condenser 65 in the event of a clog or other condenser 65 failure, the condenser 65 may comprise a serpentine condenser. Alternatively, the condenser 65 may comprise a parallel condenser. To receive coolant from the compressor 68 and direct coolant to the evaporator unit 52, the condenser 65 has an inlet and an outlet, respectively (not shown). Coolant flows through the condenser 65 and is cooled by ambient air 81 passing through the condenser 65. As such, coolant may enter the condenser's 65 as a high-pressure vapor and exit the condenser 65 as a liquid. To draw ambient air 81 over the condenser 65, the air conditioning unit 50 may further comprise a condenser fan 84. The condenser fan 84 is preferably disposed in relation to the condenser 65 such that rotation of the condenser fan 84 draws ambient air 81 over the condenser 65, as best shown in FIG. 1. As shown in FIGS. 1-2, the condenser fan 84 may be positioned behind or beneath the condenser 65.

As shown in FIG. 1, in some instances, the air conditioning unit 50 may further comprise a drier canister 66 fluidly interconnected between the condenser 65 and the evaporator unit 52 such that coolant exiting the condenser 65 passes through the drier canister 66 before entering the evaporator unit 52, as shown in FIGS. 1-2. Thus, in some instances, the drier canister 66 may bisect the connection between the condenser 65 and the evaporator 68. The drier canister 66 has an inlet to facilitate entry of coolant therein and an outlet to allow coolant to exit the drier canister 66. The drier canister 66 is configured to absorb contaminants within or transported by the coolant exiting the condenser 65. To this end, the drier canister 66 may comprise a filter adapted to trap debris present within or transported by coolant exiting the condenser 65. In some instances, the drier canister 66 may comprise desiccant configured to absorb water present within the air conditioning unit 52. Alternatively, the air conditioning unit 52 may be devoid of a drier canister 66 such that coolant exiting the condenser 65 passes directly to the evaporator unit 52 without interruption.

As best shown in FIGS. 1, 3, and 7-9, the evaporator unit 52 may comprise one or more fan vents 54b, an evaporator 55, an evaporator fan 55a, a fan speed knob 56, and a temperature control knob 57. The evaporator 55 is generally configured to absorb heat and receive coolant exiting the condenser 65. The evaporator 55 comprises one or more tubes through which coolant received from the condenser 65 may flow through and a plurality of evaporator fins through which air directed towards the evaporator 55 may pass through. To receive coolant from the condenser 65 and direct coolant back to the compressor 68, the evaporator 55 has an inlet and an outlet, respectively (not shown).

Figure 3:
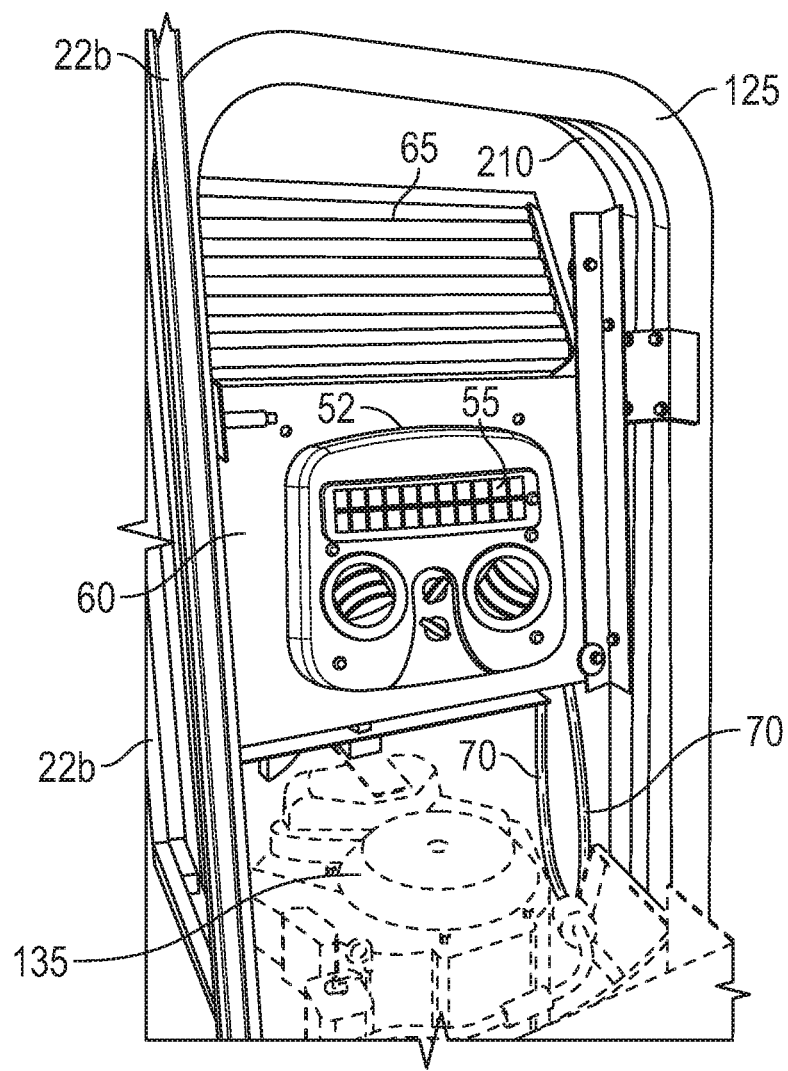
FIG. 3 shows a front perspective view of certain components of an air conditioning unit embodying features consistent with the principles of the present disclosure secured to the frame of a mower via an air conditioning frame embodying features consistent with the principles of the present disclosure.
Figure 7:
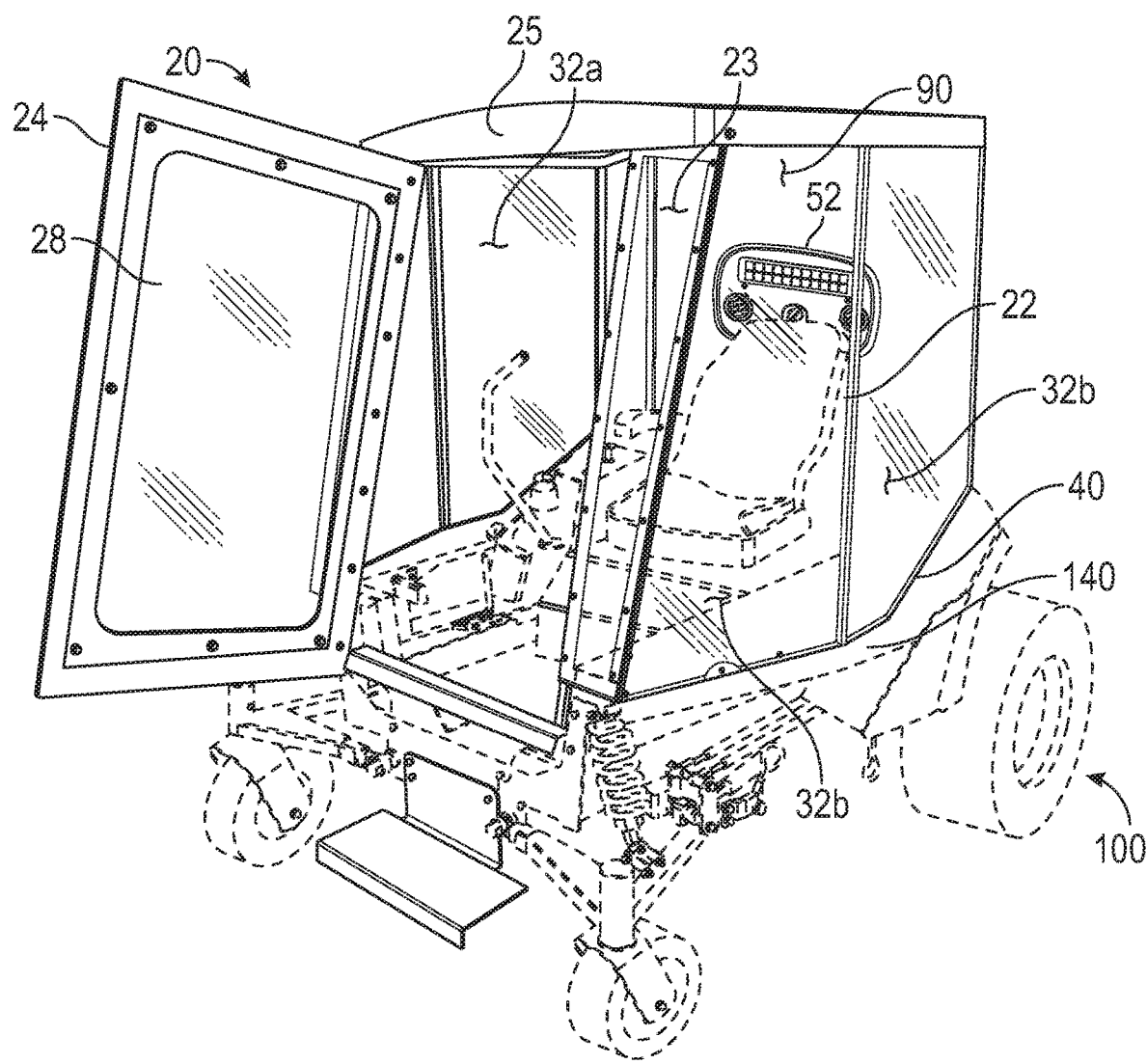
FIG. 7 is a front perspective view of certain components of an air conditioning unit embodying features consistent with the principles of the present disclosure secured in relation to an enclosed cabin.
Figure 8:
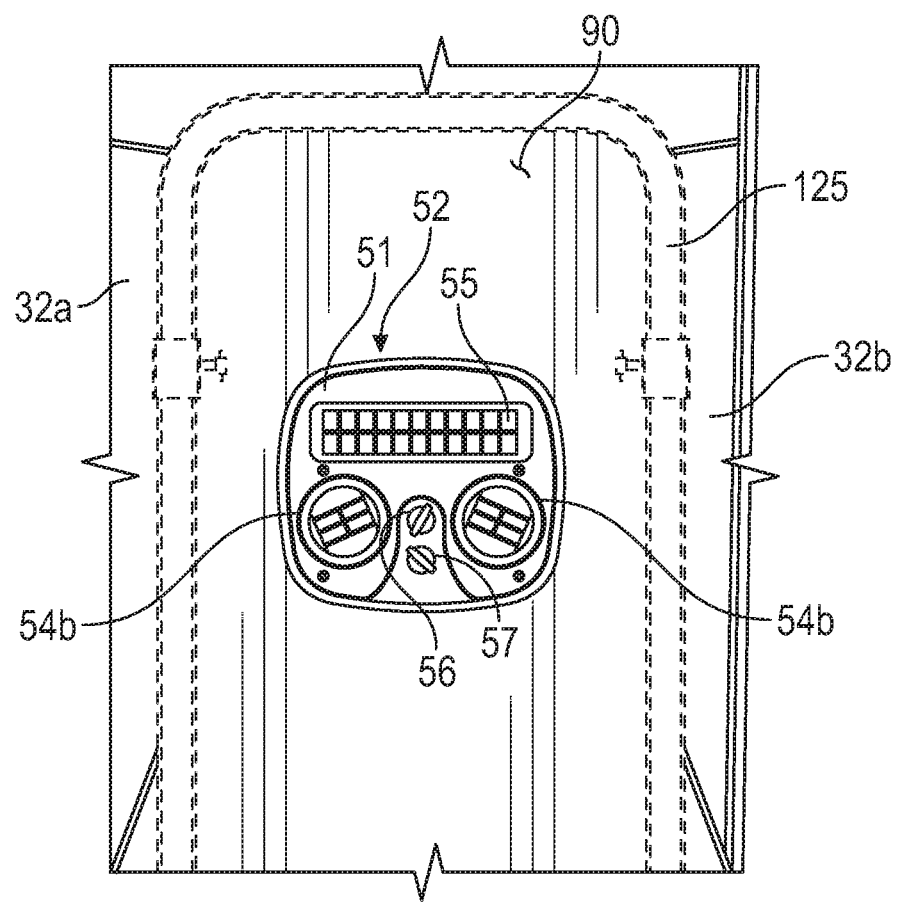
FIG. 8 is a front view of certain components of an air conditioning unit embodying features consistent with the principles of the present disclosure secured in relation to an enclosed cabin.
Figure 9:
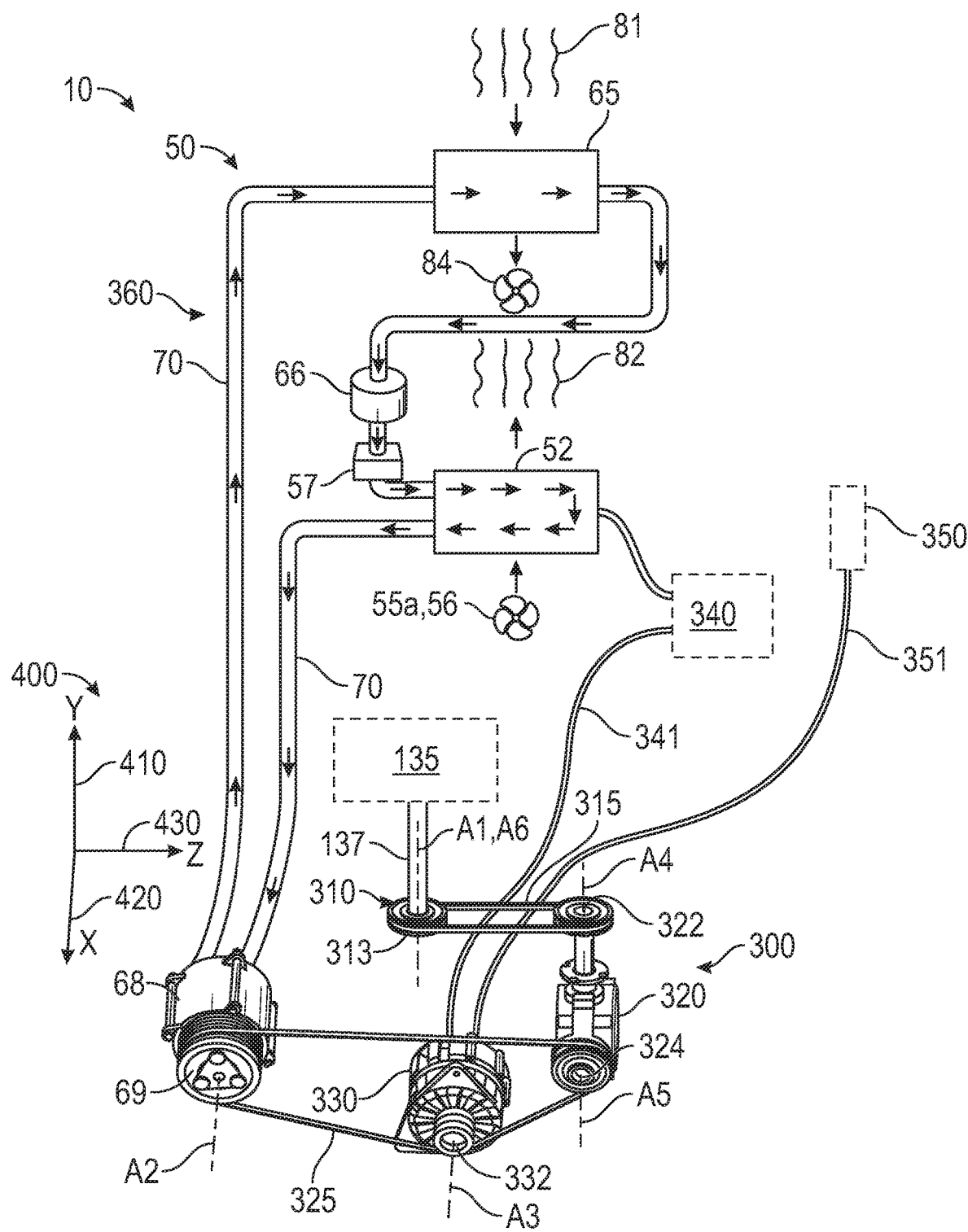
FIG. 9 is a process flow diagram of a system embodying features consistent with the principles of the present disclosure.

Coolant flows through the evaporator 55 and is heated by air passing over the evaporator 55 by action of the evaporator fan 55a such that the coolant evaporates and conditioned air 82 is emitted forwardly from the evaporator unit 52, as best shown in FIGS. 1 and 9. In some instances, the evaporator fan 55a may comprise a centrifugal fan, though other fans suitable for directing air over the evaporator 55 may be used. The direction in which conditioned air 82 is emitted from the evaporator unit 52 may be adjusted via operator interaction with the one or more vent fans 54b. Each of the one or more vent fans 54b of the evaporator unit is preferably designed such that an operator may adjust the direction of conditioned air 82 emitted by evaporator unit 52 by engaging certain air-directing features of the one or more fan vents 54b. As shown in FIGS. 3 and 7-8, the one or more fan vents 54b may include circular apertures, though one of skill in the art will appreciate the aperture design of the one or more fan vents 54b may vary and still fall within the scope of the inventive subject matter disclosed herein.

The flow of coolant entering the inlet of the evaporator 55 may be increased or decreased via user engagement with the temperature control knob 57. Preferably, the air conditioning unit 50 is designed such that a user may manipulate the temperature control knob 57 in a first manner to increase the amount of coolant entering the evaporator 55 and may manipulate the temperature control knob 57 in a second manner to decrease the amount of coolant entering the evaporator 55. For instance, in some embodiments, the air conditioning unit 50 may be designed such that a user may rotate the temperature control knob 57 in a clockwise direction to increase coolant flow and may rotate the temperature control knob 57 in a counter-clockwise direction to decrease coolant flow. Preferably, the evaporator fan 55a is operably connected to the fan speed knob 56, such that users may adjust the speed at which the evaporator fan 55a rotates by engaging the fan speed knob 56. In some instances, the evaporator fan 55a may be operably connected to the fan speed knob 56 such that a user can increase the evaporator fan's 55a rotational speed by manipulating the fan speed knob 56 in a first manner, e.g., rotating the knob clockwise, and decrease the evaporator fan's 55a rotational speed by manipulating the fan speed knob 56 in a second manner, e.g., rotating the knob counter-clockwise. As shown in FIGS. 2 and 7-8, the evaporator unit 51 may further comprise a housing 51 to which the one or more vent fans 54b, evaporator 55, evaporator fan 55a, fan speed knob 56, and temperature control knob 57 may be secured to and/or housed within.

In addition to controlling evaporator fan 55a speed, the fan speed knob 56 may act as the power switch to power the air conditioning unit 50 on or off. Accordingly, in some embodiments, users may interact with the fan speed control knob 56 of the evaporator unit 52 to power on the air conditioning unit 50 and direct electrical current to the coil of the compressor 68 causing the clutch to mate with the compressor's pulley 69. Alternatively, the air conditioning unit 50 may have a separate power switch dedicated solely to powering the air conditioning unit on and off. When powered on, the air conditioning unit 50 receives electricity from a power supply 340, such as a 12-volt battery, to power the condenser fan 84, the evaporator fan 55a, and/or the clutch of the compressor 68. The air conditioning unit 50 is electrically connected to a power supply via electrical wiring 53. As shown in FIGS. 1 and 9, the air conditioning unit 50 may be electrically connected to the power supply 340 via the evaporator unit 52. However, one of skill in the art will appreciate that the air conditioning unit 50 may be electrically connected to the power supply 340 in any manner suitable to achieve the various functions disclosed herein without departing from the inventive subject matter of the present disclosure. As shown in FIG. 1, the air conditioning unit 50 may be electrically connected to the mower's power supply 340. Alternatively, the system 10 may further comprise a power supply 340 dedicated to powering the air conditioning unit 50 that is separate from the mower's 100 power supply.

To rotate the compressor's pulley 69, the system 10 comprises a compressor drive assembly 300. As shown in FIGS. 1 and 9, the compressor drive assembly 300 is configured to transmit rotational motion generated by the engine 135 of a mower 100 to the compressor 68. To this end, the compressor drive assembly 300 is preferably configured to be interconnected between the crankshaft 137 of the mower's 100 engine 135 and the compressor's pulley 69, as best shown in FIGS. 1, 4, and 9. To facilitate such mechanical interconnection, the compressor drive assembly 300 generally comprises a crankshaft pulley assembly 310, a gear box 320 having a first pulley 322 and a second pulley 324, and a plurality of pulley belts.

As shown best in FIGS. 1 and 4, in one embodiment, the crankshaft pulley assembly 310 may comprise a first pulley 312 and a second pulley 313 in mechanical communication with each other such that rotation of the first pulley 312 causes the second pulley 313 to rotate. The first pulley 312 and the second pulley of the crankshaft pulley assembly 310 may be placed in mechanical communication with each other by securing the first pulley 312 and the second pulley 313 to an elongated member in parallel, as shown in FIGS. 1 and 4. As further shown in FIGS. 1 and 4, the first pulley 312 of the crankshaft pulley assembly 310 may be configured to be mechanically connected to the crankshaft of the mower's engine 135 using a first pulley belt 92. The first pulley 92 belt may be shaped and sized to interconnect the first pulley 312 of the crankshaft pulley assembly 310 to the engine's 135 crankshaft or to an existing pulley associated with the engine's crankshaft. Once the first pulley 312 of the crankshaft pulley assembly 310 is operably connected to the engine's 135 crankshaft 137 via the first pulley belt 92, rotation of the crankshaft causes the first pulley 312 of the crankshaft pulley assembly 310 to rotate, which, in turn, causes the second pulley 313 of the crankshaft pulley assembly 310 to rotate. Where the crankshaft pulley assembly 310 includes two pulleys, the second pulley 313 of the crankshaft pulley assembly 310 is configured to be mechanically connected to the first pulley 322 of the gearbox 320.

In another embodiment, as best shown in FIG. 9, the crankshaft pulley assembly may comprise a single pulley 313 operably connected to and adapted to receive rotational motion from the crankshaft 137 of the mower's 100 engine 135. For instance, as shown in FIG. 9, the crankshaft pulley assembly 310 may be defined by the second pulley 313 alone. Accordingly, where subsequent reference is made to pulley 313 and its mechanical connection to other components of the system 10, it is understood that the described connection exists for both single-pulley and double-pulley embodiments of the crankshaft pulley assembly 310. Where the crankshaft pulley assembly 310 is defined by a single pulley 313, the single pulley 313 may be secured to the crankshaft 137 of a mower's 100 engine 135 such that rotational motion exhibited by the crankshaft 137 is directly applied to the single pulley 313 without use of the first belt 92, as shown in FIG. 9.

As shown in FIG. 1, pulley 313 of the crankshaft pulley assembly 310 may be mechanically connected to the first pulley 322 of the gearbox 320 via a second pulley belt 315. Once pulley 313 of the crankshaft pulley assembly 310 and the first pulley 322 of the gearbox 320 are interconnected via the second pulley belt 315, rotation of pulley 313 of the crankshaft pulley assembly 310 causes the first pulley 322 of the gearbox 320 to rotate. The first pulley 322 of the gearbox 320 is in mechanical communication with the second pulley 324 of the gearbox 320 such that rotation of the first pulley 322 rotates the second pulley 324. The first pulley 322 and second pulley 324 of the gearbox may be interconnected via two or more internal gear members disposed within the gearbox's 320 body. The second pulley 324 of the gearbox 320 is mechanically connected to the compressor's pulley 69 using a third pulley belt 325. Once the second pulley 324 of the gearbox 320 is mechanically connected to the compressor's pulley 69, rotation of the second pulley 324 of the gearbox 320 causes the compressor's pulley 69 to rotate, thereby providing the compressor 68 with the rotational, mechanical energy required to compress and pump coolant to the condenser 65.

As shown in FIGS. 1, 4, and 9, the gearbox 320 may have a first shaft member to which the first pulley 322 of the gearbox 320 is secured to and a second shaft member to which the second pulley 324 of the gearbox 320 is secured. The first shaft member and the second shaft member may extend outwardly from the gearbox's 320 body in different axial directions, thus holding the first pulley 322 and the second pulley 324 in angular relation with respect to each other in order to direct the rotational, mechanical energy generated by the engine's 135 crankshaft in different axial directions. As shown in FIGS. 1, 4, and 9, in some instances, the gear box 320 may be a 90-degree gearbox such that the first shaft member and the second shaft member are disposed at an approximately 90-degree angle, thus causing the first pulley 322 and the second pulley 324 to rotate about two different axes extending in different axial directions. For instance, the first pulley 322 of the gearbox 320 may be configured to rotate about an axis A4 extending in a first axial direction while the second pulley 324 of the gearbox may be configured to rotate about an axis A5 extending in a second axial direction that is generally perpendicular to the first axial direction, as shown best in FIGS. 4 and 9. Accordingly, the compressor drive assembly 300 of the system 10 may transmit rotational motion generated by the engine's 135 crankshaft 137 rotating about an axis A1 extending in a first axial direction to a compressor pulley 69 designed to rotate about an axis A2 extending in a different axial direction than the axis A1 about which the crankshaft 137 rotates. Depending on the engine 135 and frame 140 design of the mower 100, other angled gearboxes, such as 45-degree gearboxes, may be used to transmit the rotational motion generated by the mower's 100 engine 135 to the compressor's pulley 69.

In an alternative embodiment, the compressor drive assembly 300 may utilize a pulley-belt connection (not shown) defined, at least in part, by one or more pulleys and one or more belts in place of the gearbox 320. In such embodiments, the one or more pulleys and one or more belts of the pulley-belt connection are adapted and oriented in a manner sufficient to transmit rotatory motion to the compressor's pulley 69 in the same or similar fashion as the gearbox 320. In some instances, the pulley-belt connection may further include one more belt tensioners.

To provide electrical power to certain components of the air conditioning unit 50 or the mower 100 utilizing mechanical energy generated by the engine's 135 crankshaft, the system 10 may further comprise an alternator 330 having a pulley 332 associated therewith, as shown in FIGS. 1 and 4. The alternator 330 is configured to convert rotational, mechanical energy applied to its pulley 332 into electrical energy that may be redirected to a desired system 10 or mower 100 component. In one embodiment, as shown best in FIGS. 1 and 4, the alternator's pulley 332 may be mechanically connected to the compressor's pulley 69 via a fourth pulley belt 335 such that rotation of the compressor's pulley 69 causes the alternator's pulley 332 to rotate. In such embodiments, the second pulley 324 of the gearbox 320 drives rotation of the compressor's pulley 69 via the third belt 325, which, in turn, drives rotation of the alternator's pulley 332 via the fourth belt 335. In this way, the alternator 330 may be indirectly connected to the compressor drive assembly 300. In other embodiments, as shown in FIG. 9, the alternator 330 may be directly connected to the compressor drive assembly 300 such that the alternator's pulley 332 is directly connected to and driven by the second pulley 324 of the gearbox 320. In such embodiments, a single belt, such as the third belt 325, may mechanically interconnect the second pulley 324 of the gearbox 320, the alternator's pulley 332, and the compressor's pulley 69 together.

The rotational energy applied to the alternator's pulley 332 is subsequently converted by the alternator 330 into electrical energy. As shown in FIGS. 1, 4, and 9, the alternator 330 may be electrically connected to a power supply 340 and/or ignition switch 350 of the mower 100 via electrical wiring 341, 351, respectively, such that electrical energy generated by the alternator 330 is directed to the power supply 340 and/or ignition switch 350. To direct electrical energy generated by the alternator 330 to other components within the system 10 or mower 100, the alternator may have one or more output terminals to which electrical wiring 341, 351 may be electrically connected.

Figure 5:
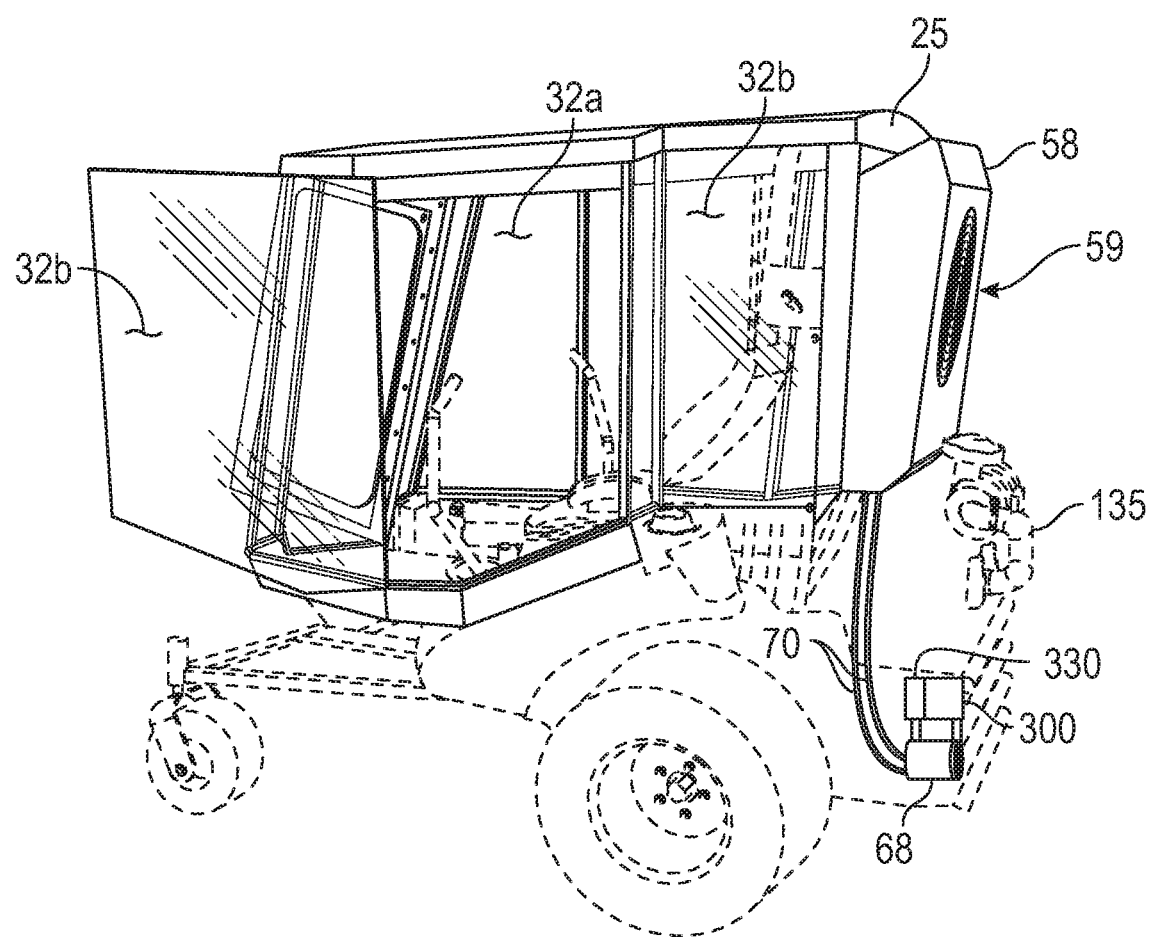
FIG. 5 is a perspective view of system embodying features consistent with the principles of the present disclosure secured in relation to an enclosed cabin.

FIG. 5 is meant to provide a general representation as to how the components of the system 10 may be positioned about a mower 100 when the system 10 is installed. As shown in FIG. 5, when the system 10 is installed on an unenclosed mower 100, each component of the air conditioning unit 50 except for the compressor 68 may be positioned above the engine 135 to provide conditioned air 82 to an operator of the mower 100. Each component of the air conditioning unit 50 except for the compressor 68 may be secured generally behind the driver's seat of the mower 100. However, one of skill in the art will readily appreciate that certain components of the air conditioning unit 50 may be secured in alternative arrangements without departing from the inventive subject matter disclosed herein. For instance, in some instances, each component of the air conditioning unit 50 except for the compressor 68 may be secured within the roof of an enclosed cabin 20, as disclosed herein. In such embodiments, the roof panel 25 of an enclosed cabin 20 may have one or more openings therein through which certain components of the air conditioning unit 50, e.g., the evaporator unit 52, may be inserted at least partially therethrough such that the roof panel 25 and certain components of the air conditioning unit 50 act to define the ceiling wall of the enclosed cabin 20. In such embodiments, conditioned air 82 emitted from the air conditioning unit 50 may be emitted downwardly from the ceiling wall of the enclosed cabin 21 to an operator of the mower 100. As further shown in FIG. 5, the compressor 68, compressor drive assembly 300, and alternator 330 may each be secured to the undercarriage or other area of the mower 100 located below the mower's 100 engine 135 to receive rotational motion from the engine's 135 crankshaft 137 in the manner described above. Accordingly, as best shown in FIGS. 1, 5, and 9, the fluid circuit 360 defined by the interconnection of the air conditioning unit's 50 compressor 68, condenser 65, and evaporator unit 52, may extend from an area located below the mower's 100 engine 135 to an area located above the mower's 100 engine 135.

In embodiments where the crankshaft pulley assembly 310 includes both a first pulley 312 and a second pulley 313, the crankshaft pulley assembly may be secured to the undercarriage or other area of a mower's 100 frame 140, either directly or indirectly, in any suitable manner that enables the first pulley 312 of the crankshaft pulley assembly 310 to be mechanically connected to the crankshaft 137 of the mower's 100 engine 135 via a first pulley belt 92 in the manner described above and that allows the first and second pulleys 312, 313 to rotate when rotational motion is applied thereto. Where the crankshaft pulley 310 includes only a single pulley 313, the crankshaft pulley assembly may be secured directly to the crankshaft 137 of the mower's 100 engine 135, as shown in FIG. 9, or indirectly to crankshaft 137 by securing to an existing mower 100 or engine 135 component connected to the crankshaft, such as an existing pulley of the mower 100 or engine 135.

To allow the second pulley belt 315 to rotate in a generally straight, unbent manner during operation of the system 10, the gearbox 120 is preferably secured, either directly or indirectly, to the mower's 100 frame 140 such that pulley 313 of the crankshaft pulley assembly 310 and the first pulley 322 of the gearbox 320 are generally parallel. Similarly, the gearbox 320 is preferably secured to the mower's 100 frame 140 such that the second pulley 324 of the gearbox 320 and the compressor's pulley 69 are generally parallel to allow the third pulley belt 325 to rotate in a generally straight, unbent manner during operation of the system 10.

The compressor 68 may be secured to the undercarriage or other area of the mower's 100 frame 140 located below the engine 135, either directly or indirectly, in any suitable manner that enables the compressor's pulley 69 to be mechanically connected to the second pulley 324 of the gearbox 320 in the manner described above and that allows the compressor's pulley 69 to rotate when rotational motion is applied thereto. As shown in FIGS. 1 and 4, in one embodiment, the alternator 330 may be secured so that the alternator's pulley 332 and compressor's pulley 69 are generally parallel to permit the fourth belt pulley 335 to rotate in a generally straight, unbent manner during operation of the system 10. In one such embodiment, the alternator's pulley 332 may be slightly offset from the second pulley 322 of the gear box 320 such that the two pulleys are not aligned and the fourth pulley belt 335 is positioned behind the third pulley belt 325. In other embodiments, the alternator 330 may be positioned such that the alternator's pulley 332 is disposed along the same plane as both the compressor's pulley 69 and the second pulley 324 of the gearbox 320, as shown in FIG. 9, so that the third pulley belt 325 may interconnect the three pulleys, thereby alleviating the need for the fourth belt 335. In one such embodiment, the alternator's pulley may be disposed lower than the compressor's pulley 69 and the second pulley 324 of the gearbox 320 to further tension the third pulley belt 325. As shown in FIGS. 1 and 4, the alternator 330 may be secured to the gearbox 320 in some instances. Alternatively, the alternator 330 may be secured to the undercarriage or other area of the mower's 100 frame 140 located below the engine or, alternatively, to the engine 135 of the mower 100.

When the system 10 is installed, the axis A1 about which the crankshaft 137 is configured to rotate may extend in a different axial direction than the axis A2 about which the compressor's pulley 69 of the air conditioning unit 50 is configured to rotate. In some embodiments, the crankshaft 137 may rotate about an axis A1 extending in a first axial direction while the compressor's pulley 68 is positioned as to rotate about an axis A2 extending in a second axial direction that is substantially perpendicular to the first axial direction 4. As indicated by the axial direction key 400 provided in FIGS. 4 and 9, in an embodiment, the axis A1 about which the crankshaft 137 rotates may extend in a generally vertical, y-axis direction 410 while the axis A2 about which the compressor's pulley 69 rotates may extend in a generally horizontal, x-axis direction 420. In alternative arrangements, the compressor 68 and or the crankshaft 137 may be oriented relative to each other so that the axial directions in which axes A1 and A2 extend are non-perpendicular. For instance, the axis A2 about which the compressor's pulley 69 rotates may extend in a generally horizontal, x-axis direction 420 while the axis A1 about which the crankshaft 137 rotates may extend in a z-axis direction 430 that extends between a horizontal, x-axis direction 420 and a vertical, y-axis direction 410.

As shown best in FIG. 9, both the axis A6 about which the one or more pulleys 312, 313 of the crankshaft pulley assembly 310 rotates and the axis A4 about which the first pulley 322 of the gearbox 90 rotates extend in the same axial direction as the axis A1 about which the crankshaft 137 rotates to facilitate transmission of rotational motion from the crankshaft 137 to the first pulley 322 of the gearbox 90. As shown in FIGS. 4 and 9, the axis A5 about which the second pulley 324 of the gearbox 90 rotates extends in the same axial direction as the axis A2 about which the compressor's pulley 69 rotates in order to transmit the rotary motion received by the gearbox 320 to the compressor's pulley 69. Where the system 10 includes an alternator 330, the axis A3 about which the alternator's pulley 332 rotates also extends in the same axial direction as the axis A2 about which the compressor's pulley 69 rotates, as further shown in FIGS. 4 and 9.

To direct conditioned air 82 generated by the evaporator unit 52 towards an operator during operation of the mower 100, the evaporator unit 52 is preferably secured in an upright position behind the seat of the mower 100, as shown best in FIGS. 3 and 7-8. The evaporator unit 52 is preferably positioned such that the vent fans 54b are not obstructed by a component of the mower 100, such as the driver's seat, to prevent conditioned air 82 emitted from the evaporator unit 52 from being blocked prior to reaching an operator of the mower 100. When the system 10 is installed, the evaporator unit 52 may act in conjunction with a rear panel 90 to define the back wall of an enclosed cabin 20, as described herein.

As shown in FIGS. 2-3, the system 10 may further comprise an air conditioning frame 210 configured to secure to the frame 140 of a mower 100 and to which at least the condenser 65 and evaporator unit 52 may be secured. As such, the air conditioning frame 210 may be used to indirectly secure one or more components of the air conditioning unit 50 to the mower's 100 frame 140. To facilitate coolant flow from the condenser 65 to the evaporator unit 52, the condenser 65 may be disposed above the evaporator unit 52 when the system 10 is installed in some embodiments, as shown in FIGS. 1-3. To this end, the condenser 65 may be secured to an upper portion of the air conditioning frame 210 while the evaporator unit 52 is secured to a middle or lower portion of the air conditioning frame 210. In other embodiments, the condenser 65 may be positioned generally behind the evaporator unit 52 when the system is installed. The air conditioning frame 210 may comprise a horizontal support member having a first end with a vertical support member extending downwardly therefrom and a second end with a second vertical support member extending downwardly therefrom, as shown best in FIGS. 2-3. As shown in FIG. 2, in addition to the evaporator unit 52 and condenser 65, the air conditioning frame 210 may also be configured to support and secure the condenser fan 84, a support frame 60, and the drier canister 66 to the frame 140 of the mower. The base of the air conditioning frame 210 may be defined by one or more foot plates 215 with openings therein through which fasteners may be inserted therethrough to secure the air conditioning frame 210 to the frame 140 of the mower 100 in an upright position, as shown in FIGS. 2-3. In some instances, the air conditioning frame 210 may be designed to secure directly behind a roll bar 125 present on the mower 100, as further shown in FIGS. 2-3.

As shown best in FIG. 3, a support frame 60 may be used to support and secure at least the evaporator unit 52 to the air conditioning frame 210. Alternatively, the evaporator unit 52 may be secured directly to the air conditioning frame 210. The support frame 60 may comprise a sheet of material having an opening centrally disposed therein and sized to span a distance between the first and second vertical members of the air conditioning frame 210. The opening within the support frame 60 may be shaped or sized such that the evaporator unit 52 may be inserted at least partially therethrough, as shown in FIG. 3. To prevent the evaporator unit 52 from becoming dislodged after insertion through the opening within the support frame 60, one or more straps 61 may be used to strap the evaporator unit 52 in place, as best shown in FIG. 2. In some instances, the condenser 65, condenser fan 84, and drier canister 66 may also be secured to the support frame 60.

Figure 6:
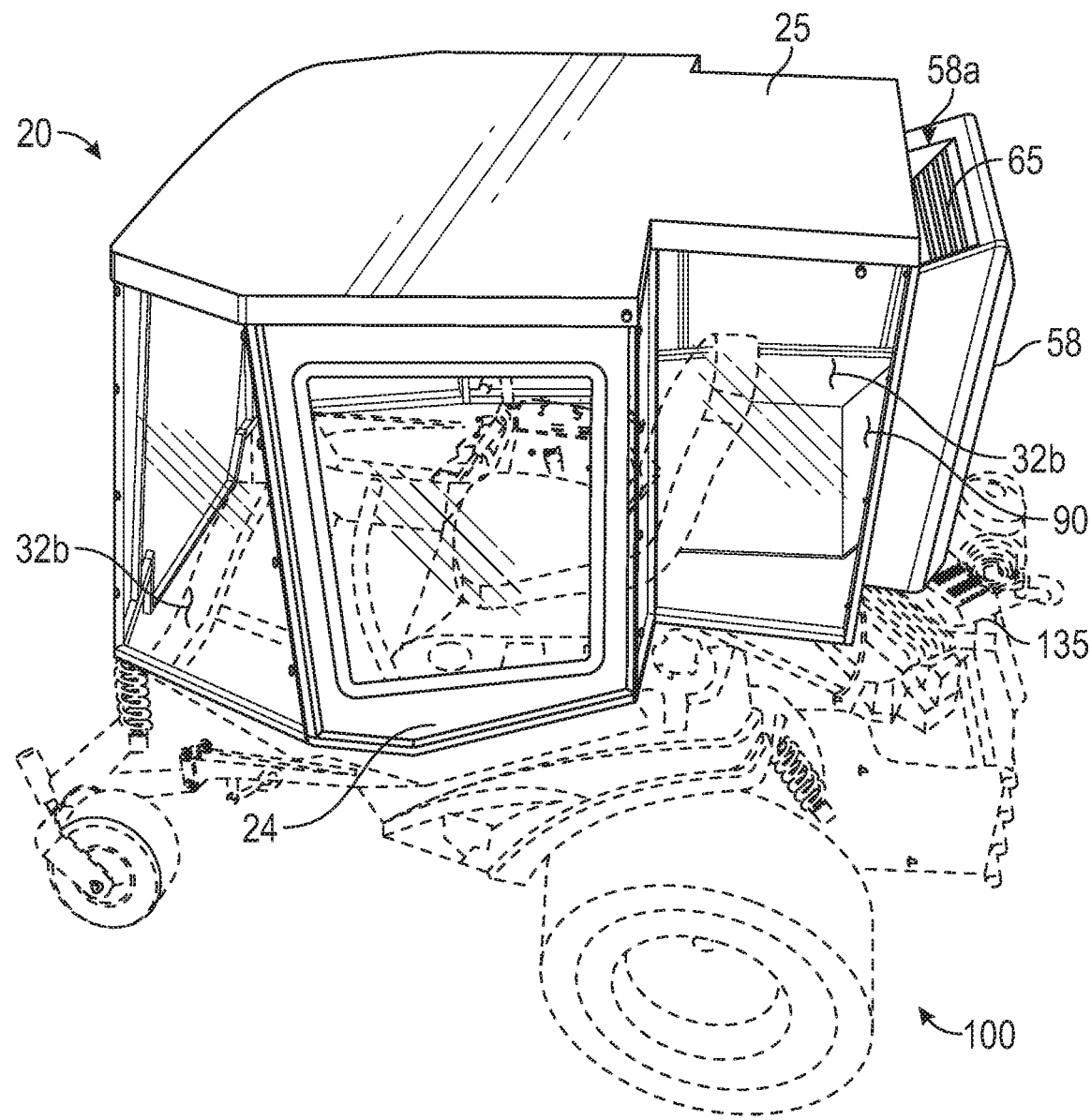
FIG. 6 is an elevated perspective view of certain components of an air conditioning unit embodying features consistent with the principles of the present disclosure secured in relation to an enclosed cabin.

To shelter the evaporator unit 52, condenser 65, condenser fan 84, and/or drier canister 66 from environmental and weather conditions during operation of the mower 100, the system 10 may further comprise a housing 58. As shown best in FIG. 4, the housing 58 may comprise a unitary a sheet of metal or molded plastic structure shaped to at least partially house each component of the air conditioning unit 50 therein, except for the compressor 68. Alternatively, the housing 58 may comprise two or more sheets of metal or plastic molds. The housing 58 may be defined by a first side, a second side, a top, a back side, and a bottom, as shown in FIGS. 4-6. The bottom of the housing 58 may have one or more openings therein to permit refrigeration hoses 70 to extend from the compressor 68 to the condenser 65 and the evaporator unit 52. The housing 58 may be secured to the air conditioning frame 210. Alternatively, the housing 58 may be secured to the upper 22 and/or lower frame 40 of an enclosed cabin 20, as described herein, or to the support frame 60. To permit ambient air 81 to pass over the condenser 65, the top of the housing 58 may have an opening 58a therein, as shown in FIGS. 4 and 6. The back side of the housing 58 may also have one or more openings 59 therein to permit exhaust generated by the system 10 to exit the housing 58.

As shown best in FIGS. 5-7, when the system 10 is installed, the system 10 may act in conjunction with an enclosed cabin 20 to provide an enclosed, air conditioned cabin that shelters operators from environmental and weather conditions during operation of the mower. As disclosed in International Application No. PCT/US17/57436, the entirety of which is incorporated in its entirety by reference, enclosed cabins 20 that may be used in conjunction with the system 10 of the present disclosure may include a cabin frame that is enclosed by a first sidewall, a second sidewall, a ceiling wall, a front wall, and a back wall that is at least partially defined by the evaporator unit 52, as shown in FIGS. 7-8. The cabin frame may be defined by an upper frame 22 and a lower frame 40 secured together, as shown in FIG. 7. The upper frame 22 of the cabin frame may comprise a plurality of horizontal support members 22a and a plurality of vertical support members 22b, as shown in FIG. 2. The lower frame 40 of the cabin frame is configured to secure to the frame 140 of the mower 100, and thus serves to anchor the enclosed cabin frame 20 to an unenclosed mower 100. As such, the lower frame 40 may be shaped to rest upon or fit within certain portions of the frame 140 of the mower 100.

The front end of the cabin frame is enclosed by a front wall, the first side of the cabin frame is defined by a first sidewall, the second side of the cabin frame is defined by a second sidewall, the back end of the cabin frame is enclosed by a back wall, and the top end of the cabin frame is enclosed by a ceiling wall. The front wall, first sidewall, second sidewall, back wall, and ceiling wall act to define and enclose an interior volume that may be occupied during operation of the mower 100. The first sidewall is defined by at least one primary side panel 32a secured to the upper frame 22 and/or lower frame 40, as shown in FIGS. 5 and 7. The second sidewall is defined by at least one secondary side panel 32b secured to the upper frame and/or the lower frame 40. The primary and secondary side panels may be transparent to permit the operator of the mower 100 to see through the sides of the enclosed cabin 20 while operating the mower 100. The ceiling wall is defined by at least one roof panel 25 secured to the upper frame 22, as shown in FIGS. 5-7. To prevent conditioned air 82 emitted by the air conditioning unit 50 from escaping the interior volume, insulating material, such as seal brushes, may be secured between each of the above-described panels and the cabin frame. To shield the interior volume from ultraviolet radiation and thermal energy associated therewith the roof panel 25 may be opaque.

Entry and exit to and from the interior volume may be facilitated by a door 24 hingedly attached to the upper frame 22 of the cabin frame. Alternatively, the door 24 may be secured to the lower frame 40. The door 24 may include a flat metal panel having a large central window 28 therein pivotally attached to the upper frame 22, as shown in FIG.

7. As the seat, steering controls, frame 140 design, and/or discharge shoot of the mower 100 may obstruct or otherwise impede operator entry into the enclosed cabin 20 via the sides of the enclosed cabin 20, the front wall of the enclosed cabin 20 may at least partially comprise the door 24. The door 24 may define the entirety of the front wall when placed in a closed configuration. Alternatively, the door 24 may be but one component serving to define the front wall. For instance, as shown in FIG. 7, the front wall of the enclosed cabin 20 may be defined by the door 24 and one or more front panels 23 secured to the upper frame 22 and/or lower frame 40. In some instances, the door 24 may be hingedly secured to the first side or the second side of the cabin frame such that the door 24 partially defines the first sidewall or the second sidewall of the enclosed cabin 20, as shown in FIG. 6.

As shown best in FIGS. 7-8, the back wall of the enclosed cabin 20 may be defined by a rear panel 90 and the evaporator unit 52. The rear panel 90 may be secured to the lower frame 40 and/or the upper frame 22 such that the rear panel 90 partially encloses the back end of the cabin frame. The rear panel 90 is preferably shaped and sized to substantially enclose the back end of the cabin frame such that the only portion of the back end of the cabin frame not enclosed by the rear panel 90 is equal to the circumference of an opening within the rear panel 90. As shown in FIGS. 7-8, the opening within the rear panel 90 is preferably shaped and sized such that at least a front side of the evaporator unit 52 may be inserted therethrough, as shown in FIGS. 7-8. In this way, the evaporator unit 52 and rear panel 90 may be secured in combination to prevent conditioned air 82 from escaping through the back wall of the enclosed cabin 20. To establish an airtight seal between the rear panel 90 and the evaporator unit 52, a gasket or rubber seal may be present on the rim of the opening within the rear panel 90.

It is understood that versions of the inventive subject matter of the present disclosure may come in different forms and embodiments. Additionally, it is understood that one of skill in the art would appreciate these forms and embodiments as falling within the scope of the inventive subject matter disclosed herein.

What is claimed is:

1. An air conditioning system for a zero-turn mower having an engine with a vertically oriented crankshaft configured to rotate about a vertical first axis, wherein a first pulley is mechanically connected to the crankshaft such that rotational motion generated by the crankshaft rotates the first pulley, the system comprising:
   an air conditioning unit including a horizontally oriented compressor having a second pulley configured to rotate about a horizontal second axis;
   an alternator having a third pulley configured to rotate about a horizontal third axis, the second axis and third axis both being perpendicular to the first axis; and
   a compressor drive assembly configured to interconnect the crankshaft to the second pulley and the third pulley such that rotation of the crankshaft causes the second pulley and the third pulley to rotate,
   wherein the compressor drive assembly comprises a gearbox comprising a vertical first shaft member having a fourth pulley secured thereto and a horizontal second shaft member perpendicular to the first shaft member and having a fifth pulley secured thereto,
   wherein the fourth and fifth pulleys are in mechanical communication such that rotation of the fourth pulley rotates the fifth pulley,
   wherein the fourth pulley is mechanically connected to the first pulley such that rotation of the first pulley rotates the fourth pulley, and
   wherein the fifth pulley is mechanically connected to both the second and third pulleys such that rotation of the fifth pulley rotates both the second and third pulleys.

2. The system of claim 1, wherein the compressor drive assembly includes a first belt connecting the second pulley and the third pulley to the compressor drive assembly.

3. The system of claim 2, first pulley is mechanically connected to the fourth pulley via a second belt and the fifth pulley is mechanically connected to the second and third pulleys via the first belt.

4. The system of claim 3, wherein the fourth pulley is configured to rotate about a fourth axis extending in the same axial direction as the first axis and the fifth pulley is configured to rotate about a fifth axis extending in the same axial direction as the second axis and the third axis.

5. The system of claim 3, wherein the compressor drive assembly comprises a crankshaft pulley assembly comprising a plurality of crankshaft pulleys, including the first pulley, wherein at least one crankshaft pulley of the plurality of crankshaft pulleys is configured to rotate about a sixth axis extending in the same axial direction as the first axis.

6. The system of claim 1, wherein the air conditioning unit further includes a condenser and an evaporator unit, wherein the compressor, the condenser, and the evaporator unit fluidly interconnect to define a fluid circuit extending from a first area located below the engine of the mower to a second area located above the engine when the system is installed on the mower.

7. The system of claim 6, further comprising an air conditioning frame to which the condenser and the evaporator unit are secured, wherein the air conditioning frame supports the condenser and the evaporator unit behind a driver's seat of the mower when the system is installed.

8. An air conditioning system for a zero-turn mower having an engine with a vertically oriented crankshaft configured to rotate about a vertical first axis extending in a first axial direction, wherein a first pulley is mechanically connected to the crankshaft such that rotational motion generated by the crankshaft rotates the first pulley, the system comprising:
   an air conditioning unit including a horizontally oriented compressor having a second pulley configured to rotate about a horizontal second axis extending in a second axial direction substantially perpendicular to the first axial direction; and
   a compressor drive assembly configured to interconnect the crankshaft to the second pulley such that rotation of the crankshaft rotates the second pulley,
   wherein the compressor drive assembly comprises a gearbox comprising a vertical first shaft member having a third pulley secured thereto and a horizontal second shaft member perpendicular to the first shaft member and having a fourth pulley secured thereto,
   wherein the third and fourth pulleys are in mechanical communication such that rotation of the third pulley rotates the fourth pulley,
   wherein the third pulley is mechanically connected to the first pulley such that rotation of the first pulley rotates the third pulley, and
   wherein the fourth pulley is mechanically connected to the second pulley such that rotation of the fourth pulley rotates the second pulley.

9. The system of claim 8, wherein the fourth pulley is mechanically connected to the second pulley via a first belt and the third pulley being mechanically connected to the first pulley via a second belt.

10. The system of claim 9, wherein the third pulley is configured to rotate about a third axis extending vertically in the first axial direction.

11. The system of claim 9, wherein the fourth pulley is configured rotate about a fourth axis extending horizontally in the second axial direction.

12. The system of claim 9, further comprising an alternator.

13. The system of claim 8, wherein the compressor and the compressor drive assembly are secured to the mower beneath the engine of the mower.

14. The system of claim 13, wherein the air conditioning unit further includes a condenser and an evaporator unit each secured above the engine.

15. The system of claim 14, wherein the compressor, the condenser, and the evaporator unit fluidly interconnect to define a fluid circuit.

16. The system of claim 14, further comprising an air conditioning frame, wherein the condenser and the evaporator unit are secured to the air conditioning frame and the air conditioning frame is secured to a frame of the mower.

17. An air conditioning system for a zero-turn mower having an engine with a vertically oriented crankshaft configured to rotate about a vertical first axis extending in a first axial direction, the system comprising:
　an air conditioning unit including a horizontally oriented compressor, a condenser, and an evaporator unit fluidly interconnected to define a fluid circuit extending from a first area located below the engine of the mower to a second area located above the engine, the compressor having a first pulley configured to rotate about a horizontal second axis;
　an alternator having a second pulley configured to rotate about a third axis, the second axis and the third axis extending in a second axial direction substantially perpendicular to the first axial direction;
　a compressor drive assembly configured to interconnect the crankshaft to the first pulley and the second pulley such that rotation of the crankshaft causes the first pulley and the second pulley to rotate, the compressor drive assembly including:
　　a crankshaft pulley assembly operably connected to the crankshaft; and
　　a gearbox having a third pulley and a fourth pulley,
　　　wherein the fourth pulley is operably connected to the first pulley and the second pulley via a first belt and is configured to rotate about a fourth axis extending in the second axial direction and the third pulley is operably connected to the crankshaft pulley assembly and is configured to rotate about a fifth axis extending in the first axial direction.

18. The system of claim 17, further comprising an air conditioning frame, wherein the condenser and the evaporator unit are secured to the air conditioning frame and the air conditioning frame is secured to a frame of the mower.

* * * * *